INVENTORS.
FRANK ZANKL & EARL R. LOHNEIS

BY Thomas A. Hanke

ATTORNEY

United States Patent Office 3,674,323
Patented July 4, 1972

3,674,323
MACHINE TOOL GUIDE WAY RESTRAINT
Frank Zankl and Earl R. Lohneis, Milwaukee, Wis., assignor to Kearney & Trecker Corporation, West Allis, Wis.
Filed Dec. 4, 1970, Ser. No. 95,262
Int. Cl. F16c 25/02
U.S. Cl. 308—3 A
4 Claims

ABSTRACT OF THE DISCLOSURE

An assembly for adjusting and maintaining alignment of machine tool guide ways. The rear surface of the way is provided with a protruding strip which extends along the length of the way. The machine tool support is provided with a complementary channel for receiving the strip. One surface of the channel forms a locating surface and all positioning of the guide way is against this surface. The positioning of the guide way against the locating surface is effected by the use of a plurality of plugs located within the machine tool support, each plug having a hole for receiving a screw. When the screw is tightened against the machine tool support, it draws the plug against the edge of the strip to force its opposite end against the locating surface.

BACKGROUND OF THE INVENTION

The present invention relates generally to machine ways and more particularly to an assembly for adjusting and maintaining alignment of the ways which support a movable member of a machine for travel in a designated path of travel.

It has been the conventional practice to locate guide ways to the machine frame by a key and keyway arrangement or by dowels. The number of dowels used depends on the length of the way. This conventional construction has been found to be objectionable because every time an accident happens on the machine in which a cutter is jammed into a workpiece, a high force is placed upon the ways and the dowels or keys are sheared or otherwise damaged. This presents quite a service problem inasmuch as the old dowels must then be drilled out, the holes drilled oversize, and oversized dowels inserted therein. A similar problem exists when keys and keyways are employed. The present invention eliminates the requirement for the dowels or the alternate key and keyway arrangement. Moreover, the use of the key and keyway construction requires additional labor. Scraping and fitting of these keys in the way and machine support keyways is necessary to obtain proper contact and alignment. The present invention eliminates a large portion of the scraping that was previously needed, thereby resulting in much faster assembly time. A large portion of the scraping is eliminated because only one surface of the protruding strip and one surface of the channel located in the machine support needs to be scraped. It is, therefore, the object of the present invention to provide a simple, inexpensive means for adjusting and maintaining alignment of machine tool guide ways.

SUMMARY OF THE INVENTION

According to the present invention, there is provided a protruding strip which extends along the length of the way. The machine tool support is provided with a complementary channel for receiving the strip. One side of the channel forms a locating surface on the machine tool support and all positioning of the way is against this locating surface. To effect the positioning of the way against this locating surface, the machine tool support is provided with a plurality of circular plugs having a hole for receiving a screw. Each circular plug has a step that acts as a clamp surface. When the screw is tightened, it draws the plug so that its associated step will bear against the edge of the strip to force its opposite edge against the locating surface for accurately locating the way on the machine tool.

DESCRIPTION OF THE PREFERRED EMBODIMENTS

Figure 1:
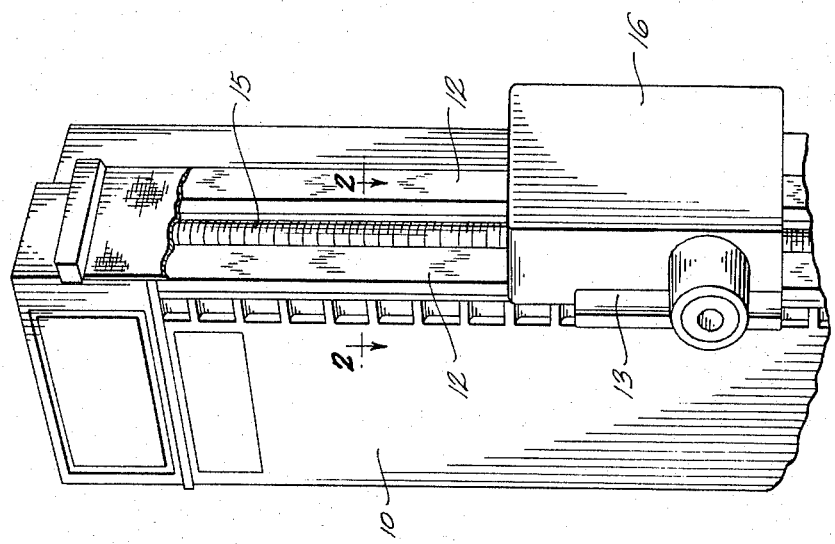
FIG. 1 is a fragmentary perspective view of an upright of a machine tool, incorporating the features of the present invention.

Referring now to FIG. 1, there is shown therein a machine tool support incorporating the features of the present invention. An upstanding column 10 is provided with vertical ways 12 for engagement by bearings (not shown) mounted in a saddle 13 for slidably supporting the saddle 13 in a vertical path of travel. Vertical movement of the saddle 13 in either direction is effected by rotating a screw 15 that is in threaded engagement with a nut (not shown) that is fixed to saddle 13. A spindle head 16 is carried by the saddle 13 and is provided with bearings (not shown) which engage complementary ways (not shown) affixed to the saddle 13 for supporting the spindle head 16 for a sliding cross-feeding movement.

Figure 2:
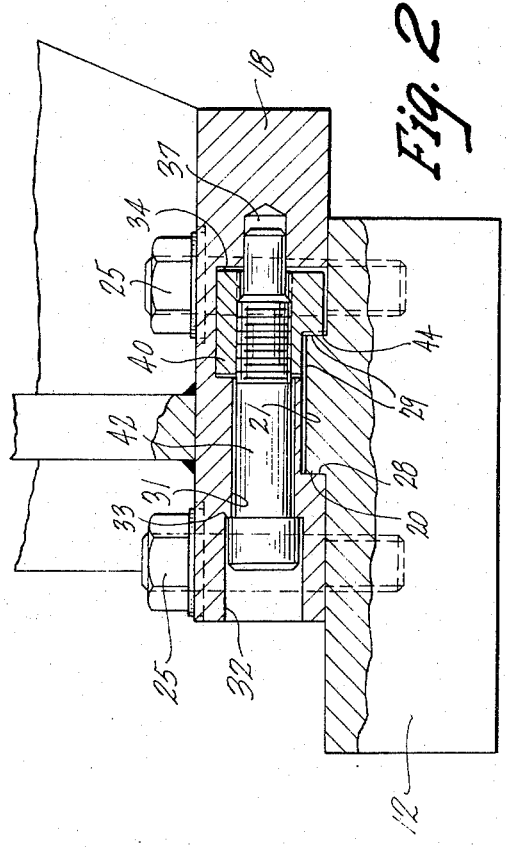
FIG. 2 is a view in horizontal section taken along the plane represented by the line 2—2 in FIG. 1, showing the features of the present invention; and,
FIG. 3 is a modified form of the invention disclosed.

FIG. 2 shows in further detail the column 10 and the vertical way 12. Column 10 is provided with a vertical flange 18 extending the length of the way 12. The rear surface of way 12 is provided with a protruding strip 20 which extends along the length of the way 12. Strip 20 is adapted to engage a channel 21 formed in the vertical flange 18. The way 12 is attached to vertical flange 18 by a plurality of bolt members 25 located along the length of way 12. The strip 20 is positioned against a reference surface 28 of the channel 21. There is a clearance 29 at the other two strip and channel surfaces.

An axial bore 31, shown in FIG. 2, is formed in vertical flange 18. The bore 31 cooperates with a counterbore 32 to form a flange shoulder 33. A chamber 34 is formed at the rightward end of axial bore 31. A pilot bore 37 is formed at the right end of chamber 34. A circular plug 40 is located within the chamber 34. A screw member 42 located in axial bore 31 is threaded into the circular plug 40 so that its pilot portion extends into the pilot bore 37. The circular plug 40 has a step surface 44 formed at the lower end that acts as a clamp surface. As the screw 42 is turned into the circular plug 40, the circular plug 40 is forced to the left, as view in FIG. 2, to effect the positioning of the protruding strip 20 against the reference surface 28. There are a plurality of these screw members 42 and circular plug 40 assemblies along the total length of the flange 18. Normal alignment procedures would call for the snugging up of bolt members 25, which are also located at intervals along the length of the ways 12. Then the screw members 42 are threaded into the circular plugs 40 to effect the positioning of the protruding strip 20 against the reference surface 28. After the desired alignment is obtained, the bolt members 25 are tightened.

Figure 3:
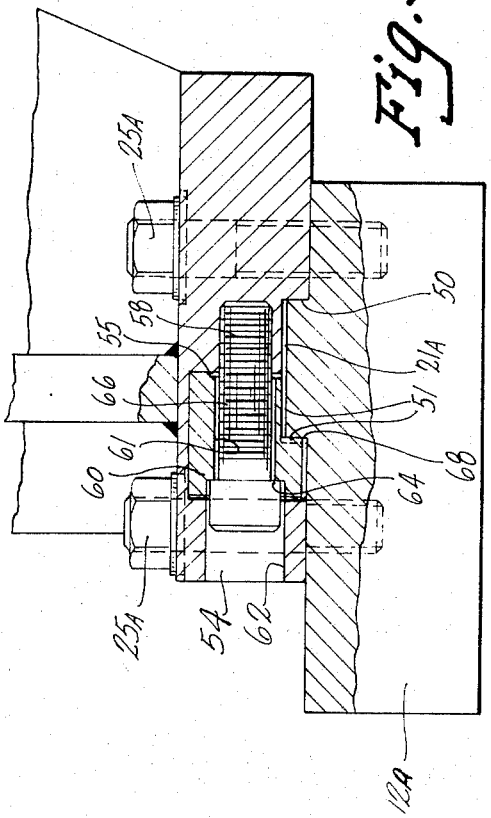

FIG. 3 illustrates a slightly modified form of the invention. As in the previously described embodiment of the invention, a machine tool column 10A is provided with a vertical flange 18A. The rear surface of way 12A is provided with a protruding strip 20A which extends the length of the way 12A. Strip 20A is adapted to engage a channel 21A formed in the vertical flange 18A. The way 12A is attached to vertical flange 18A by a plurality of bolt members 25A located at intervals along the length of way 12A. The strip 20A is positioned against a reference surface 50 of the channel 21A. There is a clearance 51 between the other two strip channel surfaces.

An axial bore 54 is formed in flange 18A. A chamber 55 is formed at the right end of axial bore 54. A threaded bore 58 is formed at the right end of chamber 55. A circular plug 60, having formed therein an axial bore 61 having a counterbore 62, is located within chamber 55. The axial bore 61 in cooperation with counterbore 62 forms a shoulder 64 which is adapted to receive the head of a screw member 66. Screw member 66 is inserted through axial bore 61 and threaded into bore 58. The circular plug 60 has a step surface 68 formed at the lower end that acts as a clamp surface. As the screw member 66 is threaded into bore 58, the circular plug 60 will be moved to right, as viewed in FIG. 3, to effect the positioning of the protruding strip 20A against the reference surface 50. Normal alignment procedures would call for the snugging up of bolt members 25A, which are located at intervals along the length of the way 12A. Then the screw member 66 are threaded into the bores 58 to effect the positioning of the protruding strip 20A against the reference surface 50. After the desired alignment is obtained, the bolt members 25A are tightened.

Although the illustrative embodiment of the invention has been described in considerable detail for the purpose of disclosing a practical operative structure whereby the invention may be practiced advantageously, it is to be understood that the particular apparatus described is intended to be illustrative only and that novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a structure for mounting a guideway of a machine tool on the frame of the machine so that the way surfaces of the guideway will guide a movable member of the machine in a precise path of travel;
   a channel in said frame presenting two walls with one of said walls constituting a locating surface;
   a protruding strip formed on said guideway with one of the edges of said protruding strip constituting a complementary locating surface for engaging with a locating surface in said channel, the opposite edge of said strip being spaced from the opposite wall of said channel when said locating surfaces are engaged; and
   adjusting means urging the guideway relative to the frame in a direction to engage the locating surface on said strip with the locating surface in said channel and to space the opposite edge of said strip from the opposite wall of said channel.

2. A structure according to claim 1 including a plurality of bores formed with the frame of said machine operable to receive said means urging the guideway relative to the frame.

3. A structure according to claim 2 wherein said adjusting means urging the guideway relative to the frame includes a plurality of plug members, each having a step surface operable to engage said protruding strip; and
   a screw member adapted to engage said plug member so that as the screw member is tightened, said step member surface will effect the movement of the locating surface of said protruding strip against said locating surface in the channel on said frame.

4. A structure according to claim 3 including a plurality of connecting members operable to secure the guideway to said frame of said machine.

References Cited
UNITED STATES PATENTS

| | | | |
|---|---|---|---|
| 1,225,726 | 5/1917 | Becker | 308—3 X |
| 2,738,625 | 3/1956 | Strand | 308—3 A |
| 3,360,306 | 12/1967 | Vargady | 308—3 R |
| 2,798,773 | 7/1957 | Walter | 308—3 A |

MARTIN P. SCHWADRON, Primary Examiner

R. H. LAZARUS, Assistant Examiner